(12) United States Patent
Zhou et al.

(10) Patent No.: US 12,284,305 B2
(45) Date of Patent: Apr. 22, 2025

(54) DISPLAY SCREEN ASSEMBLY AND MOBILE TERMINAL

(71) Applicant: Honor Device Co., Ltd., Shenzhen (CN)

(72) Inventors: Yongshan Zhou, Shenzhen (CN); Feng Zhang, Shenzhen (CN); Gao Yuan, Shenzhen (CN); Mingyuan Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/915,800

(22) PCT Filed: May 17, 2022

(86) PCT No.: PCT/CN2022/093290
§ 371 (c)(1),
(2) Date: Sep. 29, 2022

(87) PCT Pub. No.: WO2023/273664
PCT Pub. Date: Jan. 5, 2023

(65) Prior Publication Data
US 2024/0236218 A1  Jul. 11, 2024

(30) Foreign Application Priority Data

Jun. 29, 2021 (CN) .......................... 202110728042.7

(51) Int. Cl.
G02F 1/1333 (2006.01)
G02F 1/1335 (2006.01)
H04M 1/02 (2006.01)

(52) U.S. Cl.
CPC ..... *H04M 1/0266* (2013.01); *G02F 1/133331* (2021.01); *G02F 1/133512* (2013.01); *G02F 2202/22* (2013.01)

(58) Field of Classification Search
CPC ............ G02F 1/1333; G02F 1/133308; G02F 1/133311; G02F 1/133317;
(Continued)

(56) References Cited

U.S. PATENT DOCUMENTS 10,642,113 B2   5/2020 Huang et al.
11,099,703 B1 *  8/2021 Chan ....................... G06F 3/044
(Continued)

FOREIGN PATENT DOCUMENTS

CN   105244343 A      1/2016
CN   205038423 U  *  2/2016
(Continued)

OTHER PUBLICATIONS

Patent Translate CN 205038423.*

*Primary Examiner* — Thoi V Duong
(74) *Attorney, Agent, or Firm* — Leydig, Voit & Mayer, Ltd.

(57) ABSTRACT

Disclosed are a display screen assembly and a mobile terminal. The display screen assembly includes a transparent cover plate and a display module. The transparent cover plate includes a transparent region and a light-shielding region located at a side edge of the transparent region. The transparent region comprises a first inner surface, and the light-shielding region comprises a second inner surface connected to the first inner surface. The display module is stacked on the first inner surface of the transparent region. A charge blocking layer is arranged on at least a part of the second inner surface of the light-shielding region, and the charge blocking layer extends along two opposite side edges of the display module to block charges generated outside the mobile terminal from entering the display module.

18 Claims, 7 Drawing Sheets

(58) Field of Classification Search
CPC ......... G02F 1/133331; G02F 1/133512; G02F 2202/22; H04M 1/0266
See application file for complete search history.

(56) References Cited

U.S. PATENT DOCUMENTS

| | | | |
|---|---|---|---|
| 11,257,892 | B2 | 2/2022 | Luo et al. |
| 2014/0340811 | A1* | 11/2014 | Pschenitzka ............. H05F 1/02 361/220 |
| 2018/0031929 | A1* | 2/2018 | Huang ............. G02F 1/133514 |
| 2020/0227504 | A1 | 7/2020 | Luo et al. |
| 2022/0026771 | A1 | 1/2022 | Yan et al. |

FOREIGN PATENT DOCUMENTS

| | | |
|---|---|---|
| CN | 206400961 U | 8/2017 |
| CN | 206411363 U | 8/2017 |
| CN | 107664886 A | 2/2018 |
| CN | 107942570 A | 4/2018 |
| CN | 108023978 A | 5/2018 |
| CN | 108615749 A | 10/2018 |
| CN | 110244484 A | 9/2019 |
| CN | 110853522 A | 2/2020 |
| CN | 113596200 A | 11/2021 |
| WO | 2013094476 A1 | 6/2013 |

* cited by examiner

DISPLAY SCREEN ASSEMBLY AND MOBILE TERMINAL

CROSS-REFERENCE TO RELATED APPLICATIONS

This application is a National Stage of International Application No. PCT/CN2022/093290, filed on May 17, 2022, which claims priority to Chinese Patent Application No. 202110728042.7, filed on Jun. 29, 2021, both of which are hereby incorporated by reference in their entireties.

TECHNICAL FIELD

This application relates to the field of mobile device related technologies, and in particular, to a display screen assembly and a mobile terminal.

BACKGROUND

With the rapid development of display technologies, such as OLED display technologies, OLED display screens are widely applied to mobile terminal products such as mobile phones and personal digital assistants (PDA) as display screens. During use of a mobile phone screen, when a human hand touches a display screen to hold a mobile phone, an outer surface of a transparent cover plate of the display screen is relatively likely to accumulate a large quantity of charges. The charges enter the display screen through the transparent cover plate and the middle frame, and cause a feature shift in a display driving part, which affects a driving affect, thereby generating a green screen phenomenon and affecting the use and life of the mobile phone.

How to design a solution to block impact of charges generated by contact between a hand and the transparent cover plate of the display screen on driving of the display screen is a trend of research and development in the industry.

SUMMARY

This application provides a mobile terminal, to avoid display impact of charges generated by contact between a hand and a transparent cover plate of a display screen on driving of the display screen.

A display screen assembly is provided, and applied to a mobile terminal. The display screen assembly includes a transparent cover plate and a display module. The transparent cover plate includes a transparent region and a light-shielding region located at a side edge of the transparent region. The transparent region includes a first inner surface, and the light-shielding region includes a second inner surface connected to the first inner surface. The display module is stacked on the first inner surface of the transparent region.

A charge blocking layer is arranged on at least a part of the second inner surface of the light-shielding region, and the charge blocking layer extends along side edges of the display module to block charges generated outside the mobile terminal from entering the display module. Holding two sides of the mobile terminal by a human hand during use generates charges outside the transparent cover plate. Such charges are transmitted to the inside of the display screen assembly through a middle frame, which affects driving performance of the display module. The charge blocking layer on the display screen assembly can absorb and eliminate external negative charges, to prevent the external charges from entering the display module to affect driving display of the display module, thereby preventing a green screen phenomenon of the display screen.

In an embodiment, a material of the charge blocking layer includes an adhesive mixed with an electropositive hole material. The charge blocking layer is electrically positive, corresponding to the negative charges outside the display screen assembly, and can absorb and eliminate negative charges.

In an embodiment, the charge blocking layer includes a base layer disposed in the light-shielding region and a plurality of holes disposed at intervals on the base layer. The base layer is electrically positive. After the negative charges outside the display screen assembly diffuse to the light-shielding region, the plurality of holes absorb the negative charges into the inside of the plurality of holes, to prevent the negative charges from further diffusing into a display region, and the negative charges adsorbed into the holes can be neutralized and eliminated due to an electropositive hole characteristic of the base layer. The plurality of holes may be blind holes, or may be through-holes passing through the base layer. Arrangement manners of the plurality of holes are not limited.

In an embodiment, the charge blocking layer includes a plurality of protrusion structures arranged at intervals on the second inner surface of the light-shielding region. The protrusion structure has electrically positive holes, and lacks electrons, and a surface of the plurality of protrusion structures forms an adsorption surface with a large enough area to achieve a blocking effect. Negative charges enter the charge blocking layer including the plurality of protrusion structures, and the surface of the protrusion structures achieves adsorption and neutralization of charges, to limit further transfer of negative charges.

In an embodiment, the second surface of the light-shielding region is covered with an intermediate layer, the charge blocking layer is formed on a side, facing away from the second surface, of the intermediate layer, and the intermediate layer is configured to fix the charge blocking layer on the second surface. Adhesive strength between the intermediate layer and the light-shielding region is greater than adhesive strength between the charge blocking layer and the light-shielding region, which can ensure stability of the charge blocking layer in the light-shielding region.

In an embodiment, a distance between every two adjacent holes of the plurality of holes in the charge blocking layer is greater than or equal to 10 nm. The charge blocking layer includes a plurality of protrusion structures, and a distance between every two of the protrusion structures is greater than or equal to 10 nm. The distance can ensure a blocking effect of the charge blocking layer.

In an embodiment, a thickness of the charge blocking layer is greater than or equal to 1 micrometer. The charge blocking layer can cover an entire ink region, thereby achieving adsorption and neutralization of a large quantity of external charges. The charge blocking layer covers a surface of ink, and therefore does not affect light-shielding performance of the ink. In addition, the 1-micrometer thickness of the charge blocking layer does not affect an adhesive layer between the middle frame and the display screen assembly. Certainly, the thickness of the charge blocking layer can be increased on the premise of ensuring adhesiveness of the adhesive layer between the middle frame and the display screen assembly.

In an embodiment, the electropositive hole material is one or more of a perovskite positive material, an aniline-based hole material, a metal chelate composite material, or a styrene-based material.

In an embodiment, the charge blocking layer is formed through a combination of one or more of a nanoimprinting process, a photomask process, or a coating and imprinting process.

In an embodiment, the light-shielding region is formed by coating an edge of the transparent cover plate with light-shielding ink, and the light-shielding region is located in a non-display region of the display screen assembly. On the premise that space of the display screen assembly is limited, the charge blocking layer is disposed on the surface of the ink region (light-shielding region), which does not affect light-shielding performance of the ink, and does not occupy additional space of the display screen assembly.

In an embodiment, the second inner surface includes a first region and a second region connected to the first region, the second region extends along a length direction of the first region, the second region is located on a side, away from the first inner surface, of the second inner surface, and the charge blocking layer is stacked on the first region and/or the second region. A position of the charge blocking layer can be appropriately set based on a position and space of an adhesive between the display screen assembly and the middle frame, to ensure that application of the display screen assembly is not affected while ensuring a charge blocking effect.

In an embodiment, the charge blocking layer is disposed on each of the first region and the second region, and a thickness of the charge blocking layer on the first region is greater than a thickness of the charge blocking layer on the second region. The second region is further used for bonding with the middle frame of the mobile phone. The thickness of the blocking layer in the second region is less than the thickness of the charge blocking layer in the first region, and there is enough space to accommodate the adhesive without affecting assembly stability of the middle frame and the display module.

In an embodiment, an edge of the transparent cover plate is provided with a first assembling edge, the light-shielding region includes an extension region on a side away from the transparent region, the extension region covers the first assembling edge, and the charge blocking layer is stacked on the extension region.

This application provides a mobile terminal, including the described display screen assembly and a middle frame. The display screen assembly is mounted on the middle frame, and the transparent cover plate is fixed to the middle frame through bonding, to further effectively block transfer of charges.

In an embodiment, the middle frame includes a second assembling edge and a third assembling edge connected to the second assembling edge. An edge of the transparent cover plate is provided with a first assembling edge. The light-shielding region includes an extension region on a side away from the transparent region, and the extension region covers the first assembling edge. The first assembling edge and the second assembling edge are interconnected and bonded by using an adhesive layer, and the third assembling edge and a part of the light-shielding region are interconnected and bonded by using the adhesive layer. Charges generated when a human hand holds two sides of the mobile terminal cannot enter the inside of the display screen assembly due to blocking by the charge blocking layer, to ensure normal driving and display of the display module, thereby ensuring practical performance of the mobile terminal.

In an embodiment, the adhesive layer is doped with an electropositive hole material. The electropositive hole material is doped on the premise of not affecting bonding performance of the adhesive layer. The adhesive layer located between the first assembling edge and the second assembling edge can absorb and block external charges when they are transferred along the edge of the transparent cover plate, to assist the charge blocking layer located between the third assembling edge and a part of the light-shielding region in jointly blocking external charges from entering.

In an embodiment, the second inner surface includes a first region and a second region connected to the first region, the second region extends along a length direction of the first region, the second region is located on a side, away from the transparent region, of the second inner surface, the third assembling edge and the second region of the light-shielding region are interconnected, and the charge blocking layer is stacked on the first region and/or the second region.

The third assembling edge and the second region of the light-shielding region are interconnected, and the adhesive layer bonds the charge blocking layer on the second region and a surface of the third assembling edge. The first region is configured to separate the second region from the display module. In addition, the first region does not need to be bonded to the middle frame, and the charge blocking layer with a larger thickness can be disposed, to improve an adsorption and blocking effect.

In an embodiment, the charge blocking layer is disposed on each of the first region and the second region, and a thickness of the charge blocking layer on the first region is greater than a thickness of the charge blocking layer on the second region. The adhesive layer bonds the second region of the light-shielding region and a surface of the first assembling edge. The thickness of the charge blocking layer on the second region is relatively small, and there is enough space to accommodate the adhesive layer, which can ensure sealing performance of a bonding position between the middle frame and the display screen assembly while ensuring assembly flatness of the display screen assembly and the middle frame.

In an embodiment, the charge blocking layer is stacked on the extension region, the first assembling edge and the second assembling edge are interconnected, and the adhesive layer bonds the charge blocking layer on the extension region and the second assembling edge, to further ensure an effect of blocking external charges.

According to the display screen assembly described in this application, the charge blocking layer is disposed on the light-shielding region, to absorb and eliminate charges externally generated when a hand holds the mobile terminal to which the display screen assembly is applied, and prevent the charges from entering the display screen assembly through the middle frame and the transparent cover plate of the mobile terminal to affect driving display of the display module, thereby preventing a green screen phenomenon of the display screen.

BRIEF DESCRIPTION OF DRAWINGS

To describe the technical solutions in the embodiments of this application or the background more clearly, the following describes the accompanying drawings required for use in the embodiments of this application or the background.

DESCRIPTION OF EMBODIMENTS

The following describes the embodiments of this application with reference to the accompanying drawings in the embodiments of this application.

This application provides a display screen assembly for display on a mobile terminal, and the mobile terminal may be a mobile device with a display screen, such as a mobile phone and a tablet. The display screen assembly includes a transparent cover plate and a display module. The transparent cover plate includes a transparent region and a light-shielding region located at a side edge of the transparent region. The transparent region includes a first inner surface, and the light-shielding region includes a second inner surface connected to the first inner surface. The display module is stacked on the first inner surface of the transparent region. A charge blocking layer is arranged on at least a part of the second inner surface of the light-shielding region, and the charge blocking layer extends along side edges of the display module to block charges generated outside the mobile terminal from entering the display module. Specifically, negative charges generated outside the transparent cover plate because, for example, a human hand holds two sides of the mobile terminal are transferred to the inside of the display screen assembly. The charge blocking layer on the display screen assembly can absorb and eliminate external negative charges, to prevent the external charges from entering the display module to affect driving display of the display module, thereby preventing a green screen phenomenon for display of the display screen assembly.

The display screen assembly in this application is described in detail by using a display screen of a mobile phone as an example.

Figure 1:
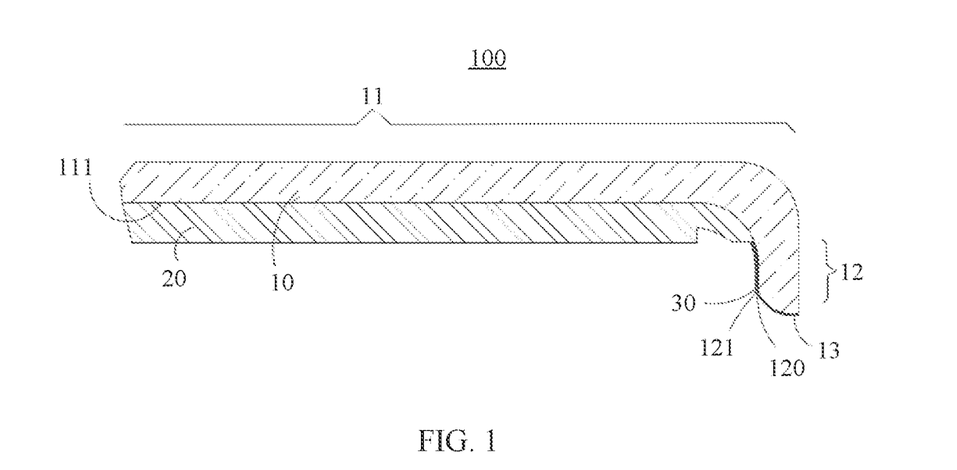
FIG. 1 is a schematic cross-sectional view of a display screen assembly according to an embodiment of this application.

Refer to FIG. 1. FIG. 1 is a schematic cross-sectional view of a display screen assembly according to an embodiment of this application. A structure of a part of the display screen assembly is shown in the figure. In this embodiment, the display screen assembly 100 includes a transparent cover plate 10 and a display module 20. The transparent cover plate 10 is connected to the display module to protect the display module 20. It should be noted that section lines thereof do not represent specific structures, but are intended to distinguish between components at positions more intuitively. The display module is a multi-layer structure, and only an overall structural cross section is shown in FIG. 1. An overall structural cross section is also shown for the charge blocking layer, and overall structural cross sections are shown for cross-sectional views of all subsequent assemblies.

Figure 2:
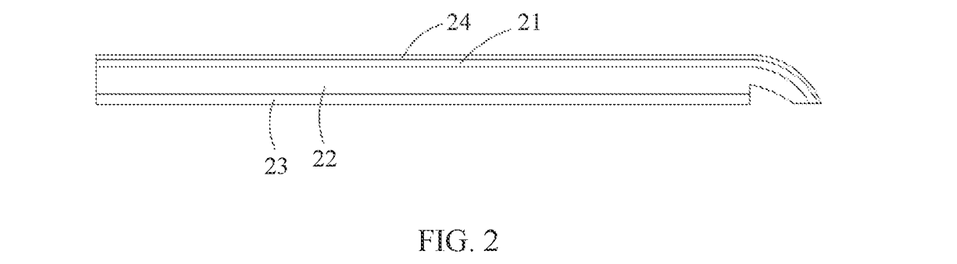
FIG. 2 is a schematic cross-sectional view of a structure of a part of a display module in the display screen assembly shown in FIG. 1.

Refer to FIG. 2 as well. FIG. 2 is a schematic cross-sectional view of a part of a structure of the display module 20 shown in FIG. 1. In this implementation, the transparent cover plate 10 is transparent glass, and is configured to encapsulate the display module 20. When the display screen assembly 100 is used in a mobile phone, the transparent cover plate 10 is located at an outermost side of the front of the mobile phone, and the transparent cover plate 10 is configured to be transparent to displayed pictures, and is touchable. The transparent cover plate 10 may be glass, resin, plastic, or the like, and for example, a glass cover plate is used. Two short sides of the transparent cover plate 10 correspond to two ends of the display screen assembly, and two long sides correspond to two sides of the display screen. The display module 20 is configured to display images and emitting display light. The display module 20 in this embodiment is an organic light-emitting diode OLED (Organic Light-Emitting Diode) display, and certainly, may alternatively be a liquid crystal display. The display module 20 includes a polarized layer 21, a display layer 22, and a buffer layer 23 that are stacked. The polarized layer 21 may be a polarizer, and the buffer layer 23 may be formed by laminating a copper sheet and foam. The display module 20 is disposed on one side of the transparent cover plate 10, and they are connected by an optical adhesive layer 24. The optical adhesive layer 24 may be an OCA (Optically Clear Adhesive) optical adhesive layer. An OCA optical adhesive has characteristics of being colorless and transparent, light transmittance of at least 90%, and high bonding strength, and the like.

In this embodiment, the transparent cover plate 10 includes a transparent region 11 and a light-shielding region 12 located at a side edge of the transparent region 11. In this embodiment, the light-shielding region 12 is located at two opposite sides of the transparent region 11, and can completely prevent light leakage from the transparent region 11. Two sides of the transparent cover plate include arc-shaped regions, and the arc-shaped regions are also a part of the transparent region. In other embodiments, the light-shielding region 12 may be disposed at a periphery of the transparent region 11, the transparent region 11 includes a first inner surface, and the light-shielding region 12 includes a second inner surface 121 connected to the first inner surface 111. The first inner surface 111 and the second inner surface 121 can be understood as surfaces on an inner side of the transparent cover plate 10, and an outer side of the transparent cover plate 10 is a side on which the display module 20 displays pictures. In this embodiment, in order that the light-shielding region 12 completely shields light of the display module 20 in the transparent region 11 to prevent the light of the display module 20 from penetrating the transparent cover plate 10 through the light-shielding region 12, the second inner surface 121 is an entire surface of the light-shielding region 12, and extends along side edges of the display module 20. The display module 20 is stacked on the first inner surface 111 of the transparent region 11. The transparent region 11 is a display region when the display screen assembly 100 is used in a mobile phone, and is configured to be transparent to display of the display module 20. The light-shielding region 12 is located in a non-display region of the display screen assembly 100. Actually, the non-display region in this embodiment is located on a side edge, which can be understood as a side frame of the display screen assembly. The light-shielding region 12 is formed by coating a region, located at an edge of the display region, of the transparent cover plate 10 with an ink layer 120, and can be understood as an ink region, which is configured to prevent light leakage from the display module. The second inner surface 121 is specifically an inner surface of the ink layer 120. In other embodiments, an arc-shaped edge region of the transparent cover plate may be a light-shielding region.

Figure 3:
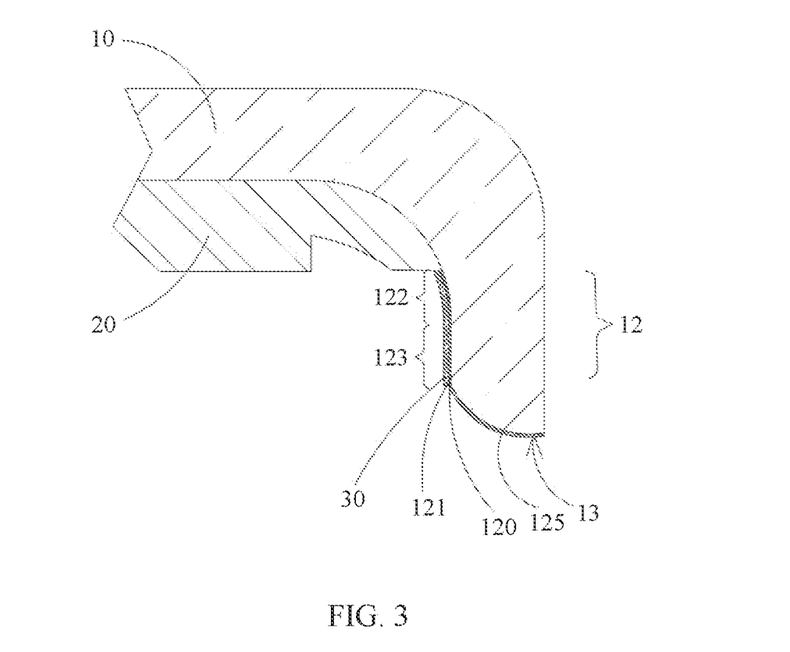
FIG. 3 is a schematic cross-sectional view of a structure of a part of an embodiment of the display screen assembly shown in FIG. 1.

The charge blocking layer 30 is arranged on the second inner surface 121 of the light-shielding region 12. The charge blocking layer 30 is arranged on a surface of the ink region. Therefore, light-shielding performance of the ink is not affected, and a micrometer-level thickness of the charge blocking layer 30 does not affect adhesive-layer connection (dispensing by using adhesive caulk) used for assembly of the display screen assembly and the middle frame. Refer to FIG. 3. The second inner surface 121 includes a first region 122 and a second region 123 connected to the first region 122, the second region 123 extends along a length direction of the first region 122, and the second region 123 is located on a side, away from the first inner surface 111, of the second inner surface 121. In an implementation of this embodiment, the charge blocking layer 30 is disposed on each of the first region 122 and the second region 123. In other words, the entire second inner surface 121 is covered with the charge blocking layer 30. The charge blocking layer 30 in this embodiment performs adsorption and blocking when external charges enter the edge of the transparent cover plate 10, to further effectively block transfer of charges. The charge blocking layer 30 is disposed on the first region 122. A direction from the first assembling edge to the second region 123 and further to the first region 122 is a direction in which external charges enter the inside of the display module 20.

In this embodiment, the charge blocking layer 30 completely covers the second inner surface 121, and the charge blocking layer 30 is located on two sides of the display module 20 and extends along the side edges of the display module 20. A position of the charge blocking layer 30 is used to completely prevent external charges from entering the display module 20. The charge blocking layer 30 has electrically positive holes, which interact with negative charges outside the transparent cover plate 10, and can adsorb and eliminate the negative charges generated outside the mobile phone, to block charges generated outside the mobile phone from entering the display module 20 through the middle frame and prevent driving of the display module from being affected, thereby preventing a green screen phenomenon of the display screen on the mobile phone. The blocking described in this application includes adsorption and elimination.

Figure 4:
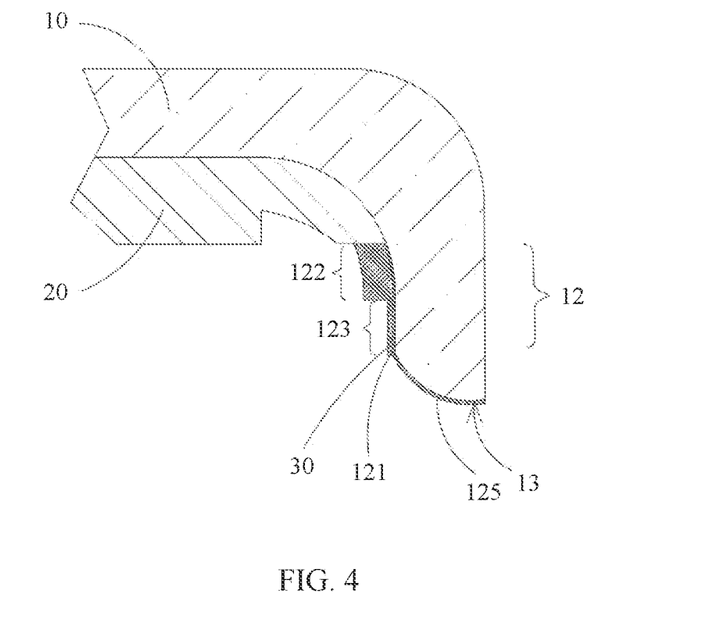
FIG. 4 is a schematic cross-sectional view of a structure of a part of another embodiment of the display screen assembly shown in FIG. 1.

Refer to FIG. 4. In another implementation, the charge blocking layer 30 is disposed on the first region 122 to cover the entire first region 122, and the charge blocking layer 30 extends along the two sides of the display module 20 to completely isolate the two sides of the display module 20 from the second region 123, so as to prevent external charges from entering the display module 20.

In this embodiment, a thickness of the charge blocking layer 30 on the first region 122 is greater than a thickness of the charge blocking layer 30 on the second region 123. The second region 123 is further used for bonding with the middle frame of the mobile phone. The thickness of the blocking layer in the second region 123 is less than the thickness of the charge blocking layer 30 in the first region 122, and there is enough space to accommodate the adhesive without affecting assembly stability of the middle frame and the display module. The thickness of the charge blocking layer 30 on the first region 122 is 5 μm. Actually, the display module 20 and the second region 123 are spaced apart by the first region 122, and the first region 122 has a large thickness and also a large area, which can enhance a blocking and adsorption effect.

Figure 5:
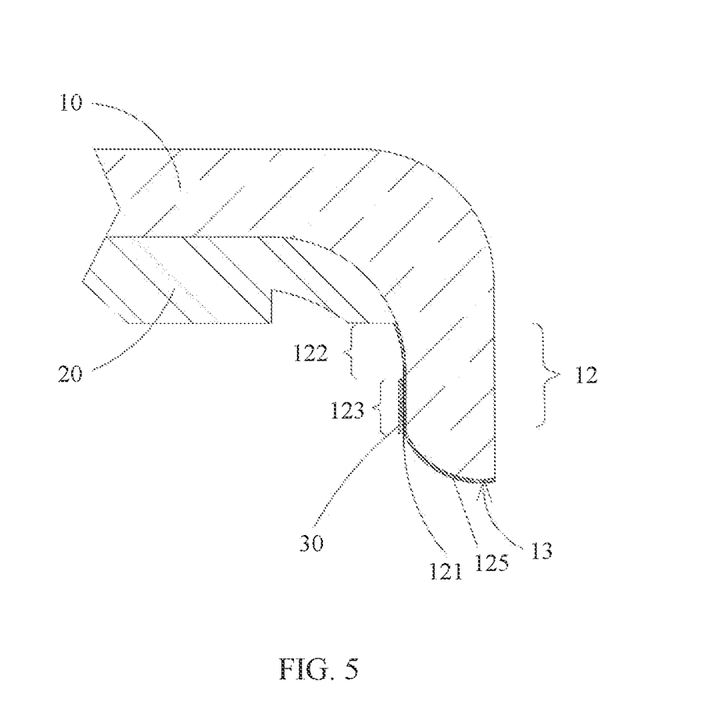
FIG. 5 is a schematic cross-sectional view of a structure of a part of an embodiment of the display screen assembly shown in FIG. 1.

Refer to FIG. 5. In another implementation, the charge blocking layer 30 is disposed on the second region 123. The first region 122 isolates the charge blocking layer 30 on the second region from the display module 20, which is convenient for processing.

Figure 6:
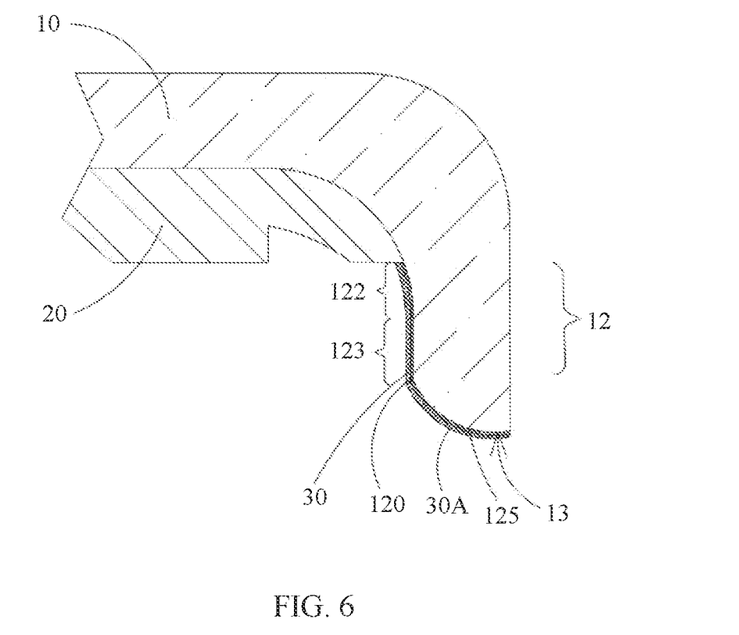
FIG. 6 is a schematic cross-sectional view of an embodiment of the display screen assembly shown in FIG. 2 with a charge blocking part arranged on an extension region.

Refer to FIG. 6. In another implementation, an edge of the transparent cover plate 10 is provided with a first assembling edge 13, the light-shielding region 12 includes an extension region 125 on a side away from the transparent region 11, and the extension region 125 covers the first assembling edge 13. The second inner surface in this implementation includes a surface on a position of the extension region. The extension region is also the ink region. In any one of the foregoing implementations, the charge blocking layer is stacked on the extension region 125. In order to clearly distinguish a position of the charge blocking layer, the charge blocking layer on the extension region 125 is denoted as 30A, which has a same structure and material as the charge blocking layer, and can be understood as extending of the charge blocking layer 30 to the extension region 125. The first assembling edge 13 is configured to connect to the middle frame of the mobile phone, and is connected and fixed by using the adhesive layer. The charge blocking layer is stacked on the extension region 125 to enhance an effect of blocking external charges.

In an embodiment of this application, a material of the charge blocking layer 30 includes an adhesive mixed with an electropositive hole material. The electropositive hole material is one or more of a perovskite positive material, an aniline-based hole material, a metal chelate composite material, or a styrene-based material. The electropositive hole material is mixed with an adhesive and then formed on the second inner surface 121 of the light-shielding region 12.

Figure 7:
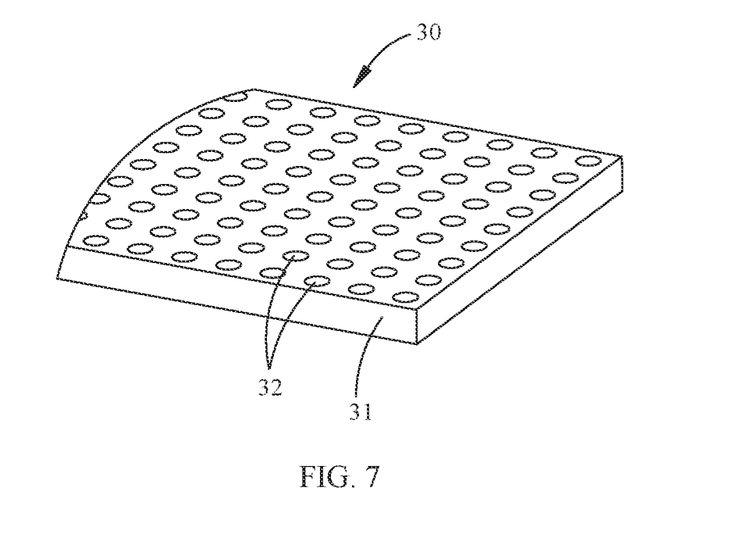
FIG. 7 is a schematic diagram of an embodiment of a charge blocking layer of the display screen assembly shown in any one of embodiments in FIG. 1 to FIG. 4.

Refer to FIG. 7. Based on the foregoing embodiment, in an embodiment of this application, the charge blocking layer 30 includes a base layer 31 stacked on the light-shielding region 12 and a plurality of holes 32 disposed at intervals on the base layer 31. The plurality of holes 32 may be blind holes, or may be through-holes passing through the base layer 31. Arrangement manners of the plurality of holes 32 are not limited, provided that processing of the holes 32 and charge blocking performance are not affected. For example, the plurality of holes 32 are evenly distributed on the base layer 31, or in a direction from the light-shielding region 12 to the transparent region 11, namely, in a direction in which the external charges enter, the plurality of holes 32 are arranged from sparse to dense. Alternatively, the plurality of holes are arranged in an array, and the holes in every two adjacent rows are staggered. That is, a hole in the first row is opposite to a position between two adjacent holes in the second row. Certainly, there may be another arrangement. Specifically, the plurality of holes 32 are evenly arranged on the base layer 31, and a thickness of the base layer 31 is greater than or equal to 1 µm. In this embodiment, the thickness of the base layer 31 is 5 µm. The hole 32 is a through-hole and penetrates through two opposite side surfaces of the base layer 31, and the opposite two side surfaces of the base layer 31 are a side surface in contact with the second inner surface 121 and the other side surface facing away from the side surface. The base layer 31 is electrically positive. After the negative charges outside the display screen assembly 100 diffuse to the light-shielding region 12, the plurality of holes 32 absorb the negative charges into the inside of the plurality of holes 32, to prevent the negative charges from further diffusing into the display region, and the negative charges adsorbed into the holes 32 can be neutralized and eliminated due to an electropositive hole characteristic of the base layer 31. The charge blocking layer 30 is formed through a combination of one or more of a nanoimprinting process, a photomask process, or a coating and imprinting process. In this embodiment, the charge blocking layer 30 is formed by using nanoimprinting and cured by using UV light or the like. The base layer 31 forming the charge blocking layer 30 is formed by using a hole material, and the material of the base layer 31 lacks electrons. Moreover, due to a total surface of the plurality of holes 32 and a blocking function, negative charges enter the holes 32 to achieve adsorption and neutralization, which limits further transfer of the negative charges. For a flexible display screen, a plurality of holes 32 are formed in a non-planar light-shielding region 12 other than the transparent region 11 of the transparent cover plate 10, and are easier to manufacture and implement by using a nanoimprinting technology.

In an embodiment of this application, a distance between every two adjacent holes 32 of the plurality of holes 323 in the charge blocking layer is greater than or equal to 10 nm. The distance is selected according to an actual requirement, to ensure that external charges can be absorbed and blocked. This can be understood as follows: There is a corresponding change trend relationship between density of the holes 32 of the charge blocking layer 30 and a quantity of charges that are generated outside the mobile terminal and that enter the display screen assembly 100. For example, during a testing process of the display screen assembly 100, a range of a quantity of charges generated during use of the display screen assembly 100 can be determined, and the density of the holes 32 and/or a size of the hole 32 can be set based on the determined range of the quantity of charges to ensure that external charges can be completely blocked from entering the inside of the display module. This can be simply understood as follows: A larger quantity of charges determined during testing indicates larger density for correspondingly disposing the holes 32, so as to effectively protect the display screen of the mobile phone during operation.

In another embodiment of this application, the charge blocking layer 30 includes a plurality of protrusion structures arranged at intervals on a surface of the light-shielding region 12. The protrusion structure may be a structure such as a column or a bar-shaped protrusion structure.

Figure 8:
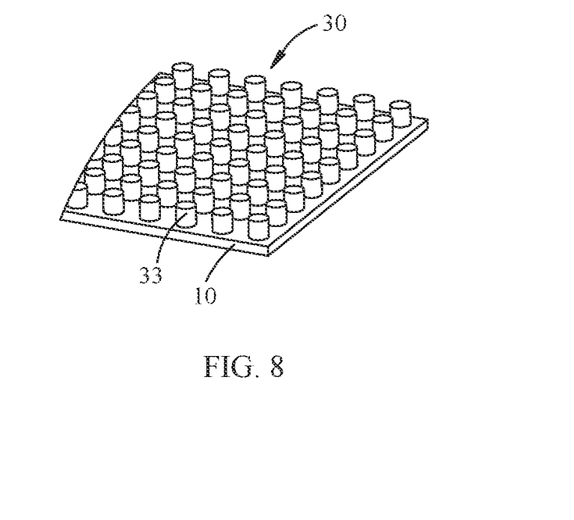
FIG. 8 is a schematic diagram of another embodiment of a charge blocking layer of the display screen assembly shown in any one of embodiments in FIG. 1 to FIG. 4.

Refer to FIG. 8. In an implementation of this embodiment, the protrusion structure is a column 33 protruding from the second inner surface, and the column may be a cylinder, a prism, or the like The cylinder is used in this embodiment. Arrangement manners of the plurality of columns are not limited. The column 33 is electrically positive. After the negative charges outside the display screen assembly 100 diffuse to the light-shielding region 12, the plurality of columns 33 block the negative charges from diffusing, and the negative charges are absorbed into an outer circumferential surface of the columns 33, to prevent the negative charges from further diffusing into the display region, and further to neutralize and eliminate the absorbed negative charges. The charge blocking layer 30 is formed through a combination of one or more of a nanoimprinting process, transfer printing, a photomask process, or a coating and imprinting process. In this embodiment, the charge blocking layer 30 is formed by using nanoimprinting and cured by UV light or the like. The column 33 lacks electrons, and a surface of the plurality of columns 33 forms an adsorption surface with a large enough area to achieve a blocking effect. Negative charges enter the charge blocking layer 30 including the plurality of columns 33, and the surface of the columns 33 achieves adsorption and neutralization of charges, to limit further transfer of negative charges. For a flexible display screen, a plurality of columns 33 with relatively small volumes are formed in the non-planar light-shielding region 12 other than the transparent region 11 of the transparent cover plate 10, and are easier to manufacture and implement by using a nanoimprinting technology.

Figure 9:
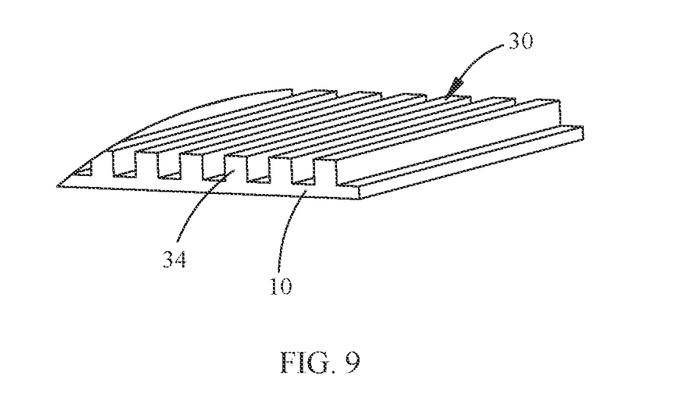
FIG. 9 is a schematic diagram of still another embodiment of a charge blocking layer of the display screen assembly shown in any one of embodiments in FIG. 1 to FIG. 4.

In another implementation of this embodiment, as shown in FIG. 9, the charge blocking layer 30 includes a plurality of bar-shaped protrusions 34 arranged at intervals on the second surface 121 of the light-shielding region 12. Specifically, arrangement manners of the plurality of bar-shaped protrusions 34 are not limited, and they are evenly distributed on the base layer 31. The plurality of bar-shaped protrusions 34 are evenly arranged, to ensure an effect of absorbing negative charges by the charge blocking layer 30. The bar-shaped protrusion 34 is electrically positive. After the negative charges outside the display screen assembly 100 diffuse to the light-shielding region 12, the plurality of bar-shaped protrusions 34 block the negative charges from diffusing, and the negative charges are absorbed into an outer surface, to prevent the negative charges from further diffusing into the display region, and further to neutralize and eliminate the absorbed negative charges. The charge blocking layer 30 is formed through a combination of one or more of a nanoimprinting process, transfer printing, a photomask process, or a coating and imprinting process. In this embodiment, the protrusion is formed by using nanoimprinting and cured by UV light or the like. Actually, the charge blocking layer 30 may include the holes 32, grooves, or protrusion structures. A cross-sectional shape of the hole 32 is not limited, and a cross-sectional shape of the protrusion is not limited, provided that they can absorb charges and block the charges outside the display screen from entering the display module through the light-shielding region 12.

In an embodiment, a distance between every two of the protrusions is greater than or equal to 10 nm. The distance is selected according to an actual requirement, to ensure that external charges can be absorbed and blocked. This can be understood as follows: There is a corresponding change trend relationship between density of the columns or bar-shaped protrusions of the charge blocking layer 30 and a quantity of charges that are outside the mobile terminal and that enter the display screen assembly 100. For example, during a testing process of the display screen assembly 100, a range of a quantity of charges generated during use of the display screen assembly 100 can be determined, and the density of the columns or bar-shaped protrusions can be set based on the determined range of the quantity of charges to ensure that external charges can be completely blocked from entering the inside of the display module. This can be simply understood as follows: A larger quantity of charges determined during testing indicates larger density for correspondingly disposing the columns or bar-shaped protrusions, so as to effectively protect the display screen of the mobile phone during operation.

In an embodiment, the second surface 121 of the light-shielding region 12 is covered with an intermediate layer (not shown in the figure), the charge blocking layer 30 is formed on a side, facing away from the second surface 121, of the intermediate layer, and the intermediate layer is configured to fix the charge blocking layer 30 on the second surface 121. For selection of a material of the intermediate layer, the material has relatively high adhesion with both the ink layer of the light-shielding region 12 and the charge blocking layer 30, to ensure that the charge blocking layer 30 can be securely formed in the light-shielding region 12 and a phenomenon of falling off is prevented, thereby ensuring a charge blocking effect.

Figure 10:
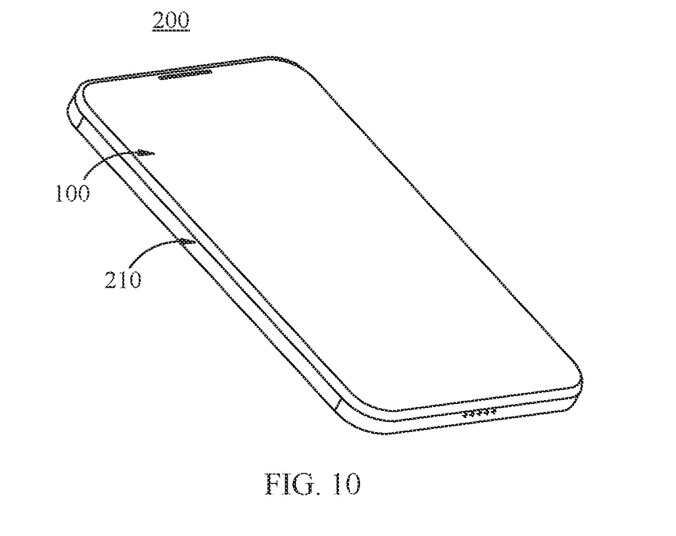
FIG. 10 is a schematic diagram of a mobile terminal according to an embodiment of this application, including the display screen assembly in this application.
Figure 11:
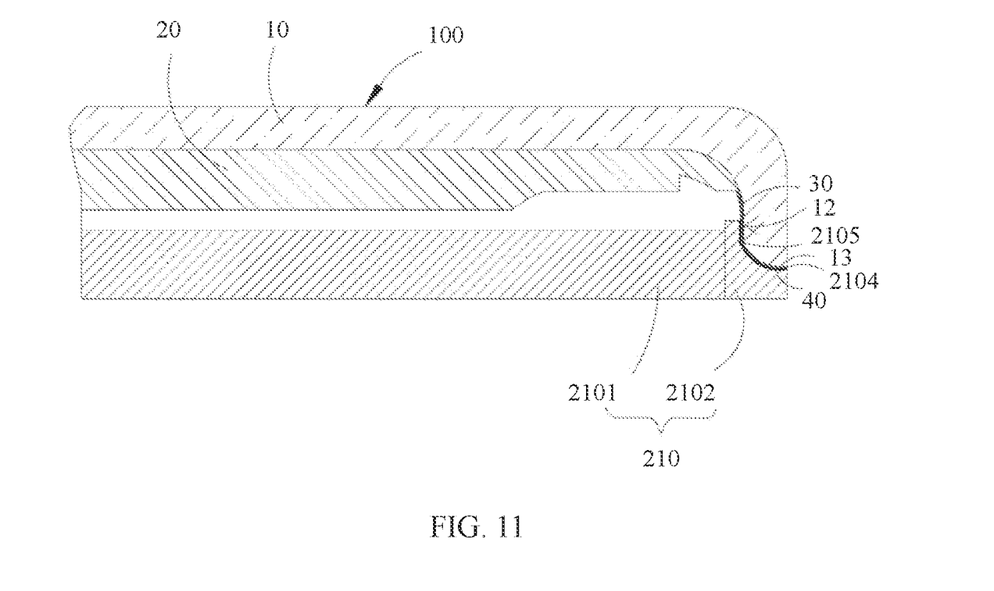
FIG. 11 is a schematic cross-sectional view of the mobile terminal shown in FIG. 10.

Refer to FIG. 10 and FIG. 11. This application provides a mobile terminal. A mobile phone is used as an example in a specific embodiment. The mobile phone 200 includes the described display screen assembly 100 and a middle frame 210. The display screen assembly 100 is mounted on the middle frame 210, and the transparent cover plate 10 is fixed to the middle frame 210 through bonding. Specifically, the middle frame 210 includes a middle board 2101 and side frames 2102 located on two sides of the middle board 2101. The middle board is configured to support and carry other structures such as batteries and circuit boards of the mobile phone, and the side frame is configured to fix and seal external structures such as the display screen assembly and a rear cover. The side frame 2102 includes a second assembling edge 2104 and a third assembling edge 2105 connected to the second assembling edge 2104. The first assembling edge 13 and the second assembling edge 2104 are interconnected and bonded by an adhesive layer 40. The third assembling edge 2105 and a part of the light-shielding region 12 are interconnected and bonded by the adhesive layer 40, so that the display module and the middle frame 210 are fixedly connected. The mobile terminal uses the display screen assembly 100 described in this application. During use, negative charges generated outside the transparent cover plate 10 enter the light-shielding region of the display screen assembly 100 through the middle frame 210. The charge blocking layer disposed in the light-shielding region can absorb and eliminate charges, to achieve a blocking effect and ensure normal display of the mobile terminal, thereby improving quality of the mobile terminal.

Figure 12:
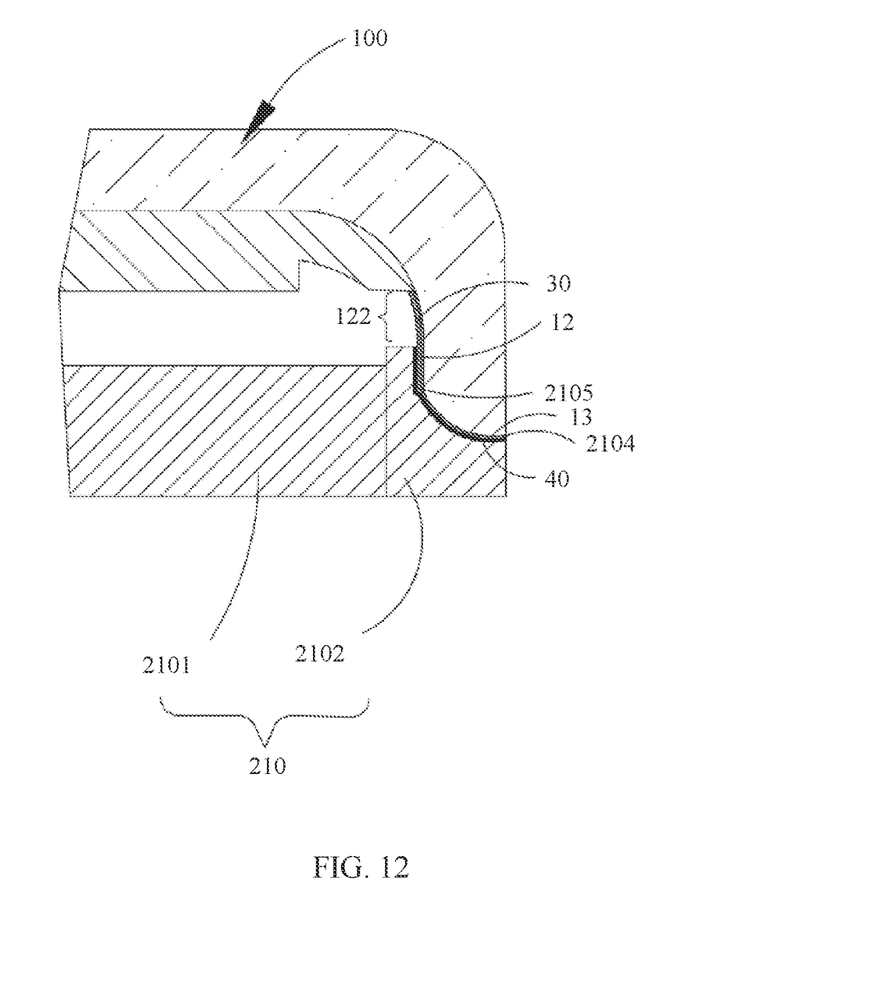
FIG. 12 is a schematic cross-sectional view of a structure of a part of the mobile terminal shown in FIG. 10.

Refer to FIG. 12 as well. In this embodiment, the charge blocking layer 30 of the display screen assembly 100 is stacked on the first region 122 and the second region 123, that is, disposed on the entire light-shielding region 12, and an extension region 125 is located outside the charge blocking layer 30. The third assembling edge 2105 and the second region 123 of the light-shielding region 12 are interconnected, and the adhesive layer 40 bonds the charge blocking layer 30 on the second region 123 and a surface of the third assembling edge 2105.

Figure 13:
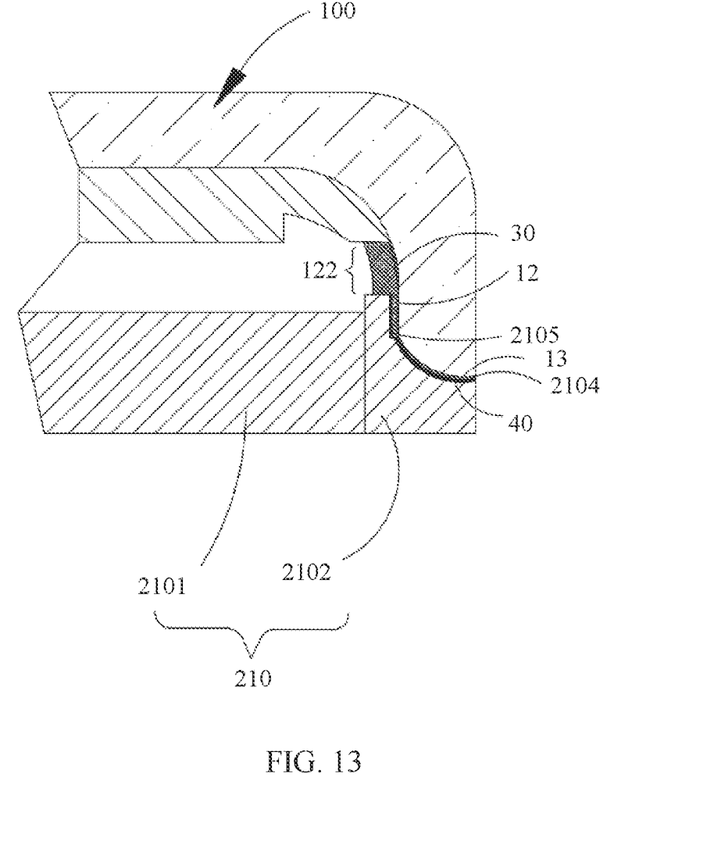
FIG. 13 is a schematic cross-sectional view of a structure of a part of another embodiment of the mobile terminal shown in FIG. 10.

As shown in FIG. 13, in an embodiment, the charge blocking layer 30 is disposed on each of the first region 122 and the second region 123, and a thickness of the charge blocking layer 30 on the first region 122 is greater than a thickness of the charge blocking layer 30 on the second region 123. The adhesive layer 40 bonds the second region 123 of the light-shielding region 12 and a surface of the first assembling edge. The thickness of the charge blocking layer 30 on the second region 123 is relatively small, and there is enough space to accommodate the adhesive layer 40, which can ensure sealing performance of a bonding position between the middle frame 210) and the display screen assembly 100 while ensuring assembly flatness of the display screen assembly 100 and the middle frame 210. In addition, the display module 20 and the second region 123 are spaced apart by the first region 122. Actually, when dispensing is performed for the adhesive layer 40 between the first assembling edge 13 and the second assembling edge 2104, an adhesive in a liquid state can be prevented from flowing into the display module of the display screen through the second region 123, thereby ensuring performance of the display module 20.

In an embodiment, the adhesive layer 40 is doped with an electropositive hole material. The electropositive hole material is doped on the premise of not affecting bonding performance of the adhesive layer 40. The adhesive layer 40 located between the first assembling edge 13 and the second assembling edge 2104 can absorb and block external charges when they are transferred along an edge of the transparent cover plate 10, to assist the charge blocking layer 30 located between the third assembling edge 2105 and a part of the light-shielding region 12 in jointly blocking external charges from entering. The adhesive layer 40 located between the third assembling edge 2105 and a part of the light-shielding region 12 may also be doped with an electropositive hole material.

Figure 14:
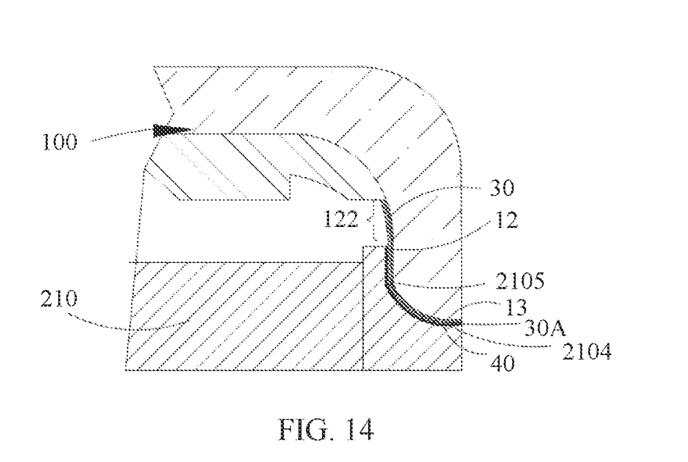
FIG. 14 is a schematic cross-sectional view of a structure of a part of still another embodiment of the mobile terminal shown in FIG. 10.

Refer to FIG. 14. In an embodiment, based on any one of the foregoing embodiments, the charge blocking layer 30A is stacked on the extension region 125, the first assembling edge 13 and the second assembling edge 2104 are interconnected, and the adhesive layer 40 bonds the charge blocking layer 30A on the extension region 125 and the second assembling edge 2104.

The foregoing descriptions are merely some embodiments and implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display screen assembly of a mobile terminal, wherein the display screen assembly comprises:
   a transparent cover plate; and
   a display;
   wherein the transparent cover plate comprises a transparent region and a light-shielding region located at a side edge of the transparent region, the transparent region comprises a first inner surface, the light-shielding region comprises a second inner surface connected to the first inner surface, and the display is stacked on the first inner surface of the transparent region;
   wherein a charge blocking layer is arranged on at least a part of the second inner surface of the light-shielding region, and the charge blocking layer extends along two opposite side edges of the display to block charges generated outside the mobile terminal from entering the display; and
   wherein an edge of the transparent cover plate is provided with a first assembling edge, the light-shielding region comprises an extension region on a side away from the transparent region, the extension region covers the first assembling edge, and the charge blocking layer is stacked on the extension region.

2. The display screen assembly according to claim 1, wherein a material of the charge blocking layer comprises an adhesive mixed with an electropositive hole material.

3. The display screen assembly according to claim 2, wherein the charge blocking layer comprises a base layer disposed in the light-shielding region and a plurality of holes disposed at intervals on the base layer.

4. The display screen assembly according to claim 3, wherein a distance between every two adjacent holes of the plurality of holes in the charge blocking layer is greater than or equal to 10 nm.

5. The display screen assembly according to claim 2, wherein the charge blocking layer comprises a plurality of protrusion structures arranged at intervals on the second inner surface of the light-shielding region.

6. The display screen assembly according to claim 5, wherein a distance between every two adjacent protrusion structures of the plurality of protrusion structures in the charge blocking layer is greater than or equal to 10 nm.

7. The display screen assembly according to claim 2, wherein the electropositive hole material is one or more of a perovskite positive material, an aniline-based hole material, a metal chelate composite material, or a styrene-based material.

8. The display screen assembly according to claim 1, wherein the second surface of the light-shielding region is covered with an intermediate layer, the charge blocking layer is formed on a side of the intermediate layer facing away from the second surface, and the intermediate layer is configured to fix the charge blocking layer on the second surface.

9. The display screen assembly according to claim 1, wherein a thickness of the charge blocking layer is greater than or equal to 1 micrometer.

10. The display screen assembly according to claim 1, wherein the charge blocking layer is formed through a combination of one or more of a nanoimprinting process, a photomask process, or a coating and imprinting process.

11. The display screen assembly according to claim 1, wherein the light-shielding region is formed by coating an edge of the transparent cover plate with light-shielding ink, and the light-shielding region is located in a non-display region of the display screen assembly.

12. The display screen assembly according to claim 1, wherein the second inner surface comprises a first region and a second region connected to the first region, the second region extends along a length direction of the first region, the second region is located on a side of the second inner surface away from the first inner surface, and the charge blocking layer is stacked on at least one of the first region or the second region.

13. The display screen assembly according to claim 12, wherein the charge blocking layer is disposed on each of the first region and the second region, and a thickness of the charge blocking layer on the first region is greater than a thickness of the charge blocking layer on the second region.

14. A mobile terminal, comprising:
a display screen assembly; and
a middle frame;
wherein the display screen assembly comprises a transparent cover plate and a display;
wherein the transparent cover plate comprises a transparent region and a light-shielding region located at a side edge of the transparent region, the transparent region comprises a first inner surface, the light-shielding region comprises a second inner surface connected to the first inner surface, and the display is stacked on the first inner surface of the transparent region;
wherein a charge blocking layer is arranged on at least a part of the second inner surface of the light-shielding region, and the charge blocking layer extends along two opposite side edges of the display to block charges generated outside the mobile terminal from entering the display;
wherein the display screen assembly is mounted on the middle frame, and the transparent cover plate is fixed to the middle frame through bonding;
wherein the middle frame comprises a second assembling edge and a third assembling edge connected to the second assembling edge;
wherein an edge of the transparent cover plate is provided with a first assembling edge;
wherein the light-shielding region comprises an extension region on a side away from the transparent region;
wherein the extension region covers the first assembling edge;
wherein the first assembling edge and the second assembling edge are interconnected and bonded by using an adhesive layer; and
wherein the third assembling edge and a part of the light-shielding region are interconnected and bonded by using the adhesive layer.

15. The mobile terminal according to claim 14, wherein the adhesive layer is doped with an electropositive hole material.

16. The mobile terminal according to claim 7, wherein the second inner surface comprises a first region and a second region connected to the first region, the second region extends along a length direction of the first region, the second region is located on a side of the second inner surface away from the transparent region, the third assembling edge and the second region of the light-shielding region are interconnected, and the charge blocking layer is stacked on at least one of the first region and the second region.

17. The mobile terminal according to claim 16, wherein the charge blocking layer is disposed on each of the first region and the second region, and a thickness of the charge blocking layer on the first region is greater than a thickness of the charge blocking layer on the second region.

18. The mobile terminal according to claim 7, wherein the charge blocking layer is stacked on the extension region, the first assembling edge and the second assembling edge are interconnected, and the adhesive layer bonds the charge blocking layer on the extension region and the second assembling edge.

* * * * *

UNITED STATES PATENT AND TRADEMARK OFFICE
CERTIFICATE OF CORRECTION

PATENT NO. : 12,284,305 B2
APPLICATION NO. : 17/915800
DATED : April 22, 2025
INVENTOR(S) : Zhou et al.

Page 1 of 1

It is certified that error appears in the above-identified patent and that said Letters Patent is hereby corrected as shown below:

In the Claims

Claim 16, Column 14, Line 40: "16. The mobile terminal according to claim 7, wherein the" should read -- 16. The mobile terminal according to claim 14, wherein the --.

Claim 18, Column 14, Line 54: "18. The mobile terminal according to claim 7, wherein the" should read -- 18. The mobile terminal according to claim 14, wherein the --.

Signed and Sealed this
Twenty-seventh Day of May, 2025

Coke Morgan Stewart
*Acting Director of the United States Patent and Trademark Office*